June 26, 1923.  
J. O. PATTY  
HUMIDIFIER  
Filed Feb. 10, 1921  
1,459,794  
2 Sheets-Sheet 1
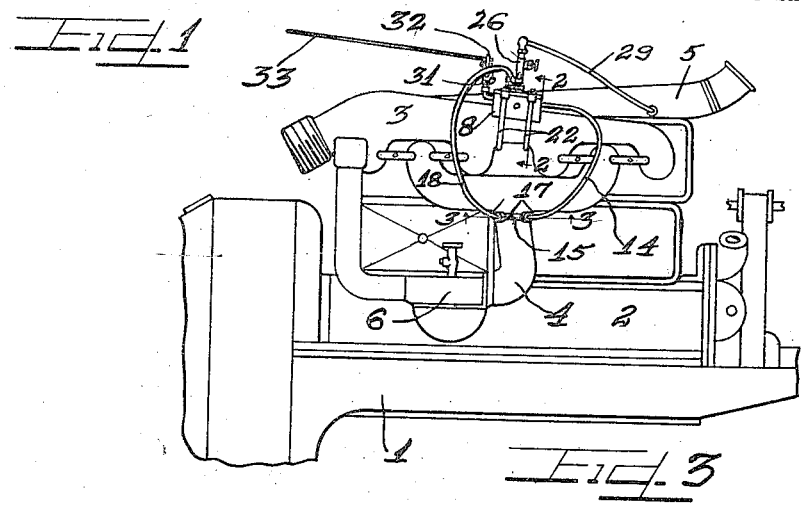
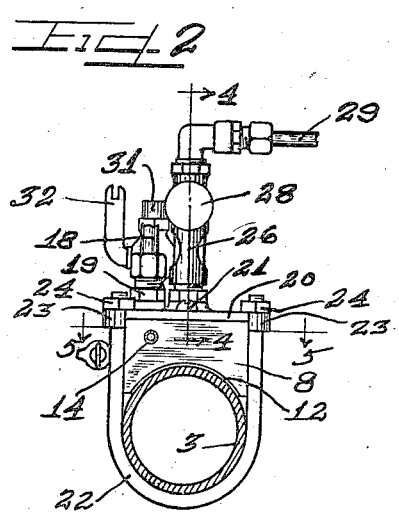
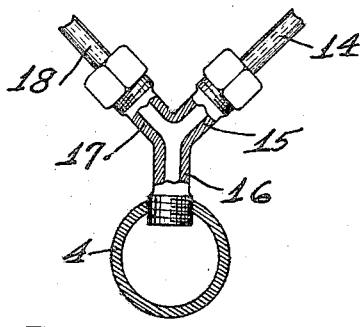
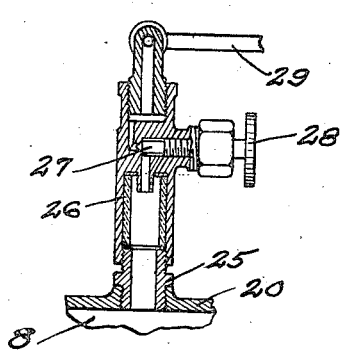
Witnesses  
Rudolph T. Berg.  
Careton Hill
Inventor  
JAMES O. PATTY.  
By Chad Lee W. Hill  
Atty.

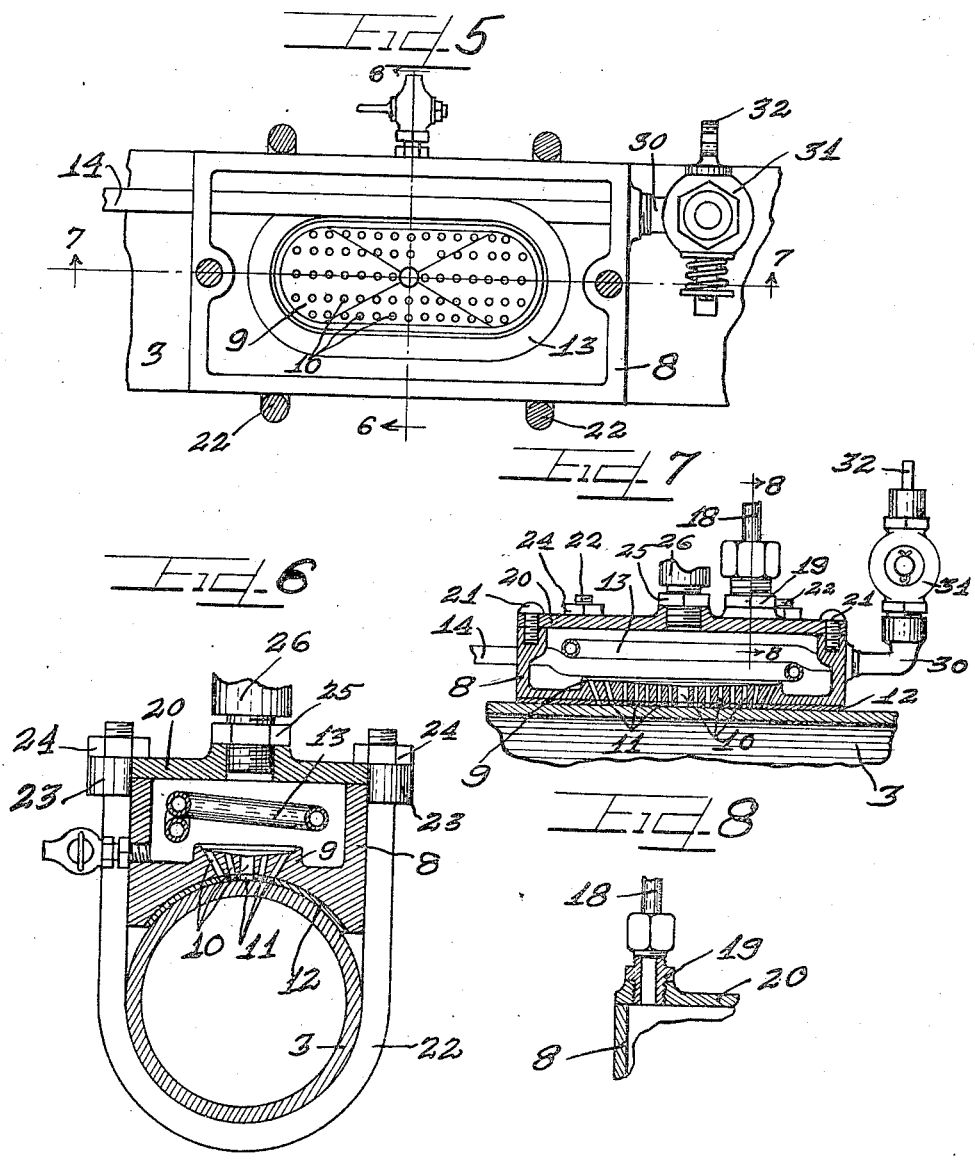

Patented June 26, 1923.

1,459,794

UNITED STATES PATENT OFFICE.

JAMES O. PATTY, OF CHICAGO, ILLINOIS.

HUMIDIFIER.

Application filed February 10, 1921. Serial No. 443,785.

*To all whom it may concern:*

Be it known that I, JAMES O. PATTY, a citizen of the United States, and a resident of the city of Chicago, in the county of Cook and State of Illinois, have invented certain new and useful Improvements in a Humidifier; and I do hereby declare that the following is a full, clear, and exact description of the same, reference being had to the accompanying drawings, and to the numerals of reference marked thereon, which form a part of this specification.

This invention relates to an improved type of a hot air and steam humidifying mechanism adapted to be readily clamped in position on the exhaust manifold of an automobile engine and having the interior thereof connected with the engine water jacket outlet pipe and with the atmosphere whereby air and water entering the humidifying mechanism are adapted to be heated by the exhaust manifold and supplied to the engine intake manifold in the form of mixed hot air and steam to mix with the explosive mixture entering the engine.

It is an object of this invention to provide an improved hot air and steam device adapted to be readily mounted upon the exhaust manifold of an engine to supply a mixture of hot air and steam to the intake manifold of the engine.

Another object of the invention is the construction of a humidifier requiring but two drillings in an engine to permit a mixture of hot air and steam to be supplied from the humidifier to an explosive mixture entering the engine cylinders.

A further object of the invention is the construction of a device adapted to be readily clamped in place on the exhaust manifold of an engine and connected with the engine water jacket outlet pipe and with the engine intake manifold.

It is furthermore an object of the invention to provide a humidifier adapted to be heated by the exhaust manifold of an engine to supply a mixture of hot air and steam to the explosive mixture in the engine intake manifold before entering the engine cylinders to increase the operating efficiency of the engine.

It is an important object of this invention to provide a humidifier of simple and effective construction adapted to be shipped as a unit and readily attached to the exhaust manifold of an engine and requiring but two drillings in the engine to permit the humidifier to be connected with the water jacket outlet pipe and with the engine intake manifold.

Other and further important objects of this invention will be apparent from the disclosures in the drawings and specification.

The invention (in a preferred form) is illustrated in the drawings and hereinafter more fully described.

On the drawings:

Figure 1 is a side elevation of an automobile engine equipped with a humidifier embodying the principles of this invention.

Figure 2 is an enlarged detail end view of the device taken on line 2—2 of Figure 1.

Figure 3 is a fragmentary detail section partly in elevation taken on line 3—3 of Figure 1.

Figure 4 is a detail section taken on line 4—4 of Figure 2.

Figure 5 is an enlarged top plan view of the device taken on line 5—5 of Figure 2.

Figure 6 is a transverse section taken on line 6—6 of Figure 5 showing the cover in place.

Figure 7 is a reduced longitudinal section of the device taken on line 7—7 of Figure 5.

Figure 8 is a fragmentary detail section taken in line 8—8 of Figure 7.

As shown on the drawings:

The reference numeral 1 indicates a portion of a chassis frame of an automobile having an engine 2 supported thereon. The engine is provided with an exhaust manifold 3, an intake manifold 4 and a water jacket outlet pipe 5. A carbureter 6 is connected in the engine intake manifold 4.

The humidifier comprises a casing 8 the bottom of which is rounded to seat upon the top of the engine exhaust manifold 3. Integrally formed on the inner surface of the casing bottom is a boss 9 having a plurality of openings or passages 10 therein, the lower ends of which register with a plurality of apertures or openings 11 in a strip or plate 12 of insulating material disposed between the humidifier casing 8 and the top of the engine exhaust manifold 3. The upper surface of the casing boss 9 is concave with the lowest point at the middle where the largest opening 10 is provided.

Disposed within the casing 8 is a pipe coil 13 one end 14 of which projects through an opening in one end of the casing 8 and connects up with an arm 15 of a three way or Y-connector, the middle arm 16 of which is threaded into an opening drilled in the intake manifold 4 between the carbureter 6 and the engine. The third arm 17 of the three way connector has connected therewith one end of a steam pipe or tube 18 the upper end of which is connected to a nipple 19 threaded into an opening in a boss formed on top of a casing cover plate 20. The cover 20 is removably secured to the top of the casing 8 by screws 21. The casing 8 and its cover 20 are clamped upon the engine exhaust manifold by means of staple or U-bolts 22, the ends of which project upwardly through apertured lugs 23 integrally formed on the sides of the cover 8. Nuts 24 are threaded upon the upper projecting ends of the staple bolts 22.

Formed on top of the middle portion of the cover 20, is an apertured boss into which is threaded a nipple 25 on the upper end of which is secured a water control valve casing 26, provided with a needle valve 27 adapted to be adjusted by turning a head 28 formed on the outer end of the valve stem. A water supply pipe or tube 29 has one end connected to the upper end of the valve casing 26. The other end of the water supply tube 29 is tapped into the engine water jacket outlet pipe 5.

As illustrated in Figure 7 the second end of the air coil 13 projects outwardly through one end of the casing 8 and is bent to afford an elbow 30. Supported on the elbow 30 is an air inlet control valve 31 provided with a notched control lever 32 for adjusting the valve to regulate the amount of air adapted to flow into the air coil 13. Connected to the notched lever 32 is the rear end of a regulating rod 33, the front end of which is positioned to be operated from the dash of the automobile.

The operation is as follows:

The humidifier is securely clamped upon the engine exhaust manifold 3 by means of the staple bolts 22 which also serve to hold the casing cover 20 in place. The water control needle valve 27 is adjusted by means of the head 28 to permit water from the water jacket outlet pipe 5 to flow through the tube 29 through the water valve casing 26 and the nipple 25 into the casing 8. The water is permitted to drop from the nipple 25 upon the boss 9 and runs into the boss passages 10 and the plate openings 11 into contact with the heated engine exhaust manifold 3. The heat from the exhaust manifold acts to heat the water in the boss passages to form a steam within the casing 8. The steam rising around the air coil 13 heats the same and leaves the casing 8 by way of the outlet tube 18 to pass through the three way connector arms 17 and 16 into the engine intake manifold.

The air regulating valve 31 is adapted to be operated from the dash board of an automobile or from any other suitable position by simply actuating the control rod 33 connected to the valve lever 32. With the valve 31 open a desired amount of air is permitted to pass through the air valve 31 and the elbow 30 through the air coil 13 within the casing 8. The pipe coil 13 is heated by the steam formed within the casing 8. The air passing through said coil 13 becomes heated during its passage through the coil 13 and flows through the tube 14 into the arm 15 of the three-way connector. The steam and heated air flow through the mixing arm 16 of the connector and mix with one another before entering the intake manifold 4 of the engine. The mixture of hot air and steam is thus permitted to mix with the explosive mixture coming from the carbureter 6 before the explosive mixture leaves the intake manifold and enters the cylinders of the engine 2.

The amount of water dripping upon the casing boss 9 of course is regulated by the water control valve 27, while the quantity of air admitted into the coil 13 is controlled by the air valve 31. Attention is directed to the fact that in mounting the humidifier in position for use it is only necessary to drill two holes in the engine, one in the water outlet pipe 5 and the other in the engine intake manifold 4. The casing 8 is clamped upon the exhaust manifold 3 by means of the U-shaped bolts 22. The humidifier may be shipped as a compact unit and may readily be installed upon an engine by an unskilled person.

I am aware that numerous details of construction may be varied through a wide range without departing from the principles of this invention, and I therefore do not purpose limiting the patent granted otherwise than necessitated by the prior art.

I claim as my invention:

1. The combination with an explosive engine and its intake and exhaust manifolds, of a humidifier comprising a casing adapted to be mounted on said exhaust manifold, an apertured boss formed on the inner surface of the base of said casing, means permitting water to drip on said apertured boss, a steam outlet tube connected with the top of said casing, an air pipe coil in said casing above said apertured boss, means connected with one end of said pipe coil for controlling the flow of air through said pipe coil, an air outlet tube connected with the other end of said pipe coil, and a three-way connector mounted on the engine intake manifold to which said air outlet tube and said steam outlet tube are connected.

2. The combination with an automobile engine and the exhaust manifold, the intake manifold and the water outlet pipe thereof, of a humidifier comprising a casing, means for clamping the casing on the exhaust manifold, an apertured plate between the exhaust manifold and said casing, a boss in said casing having apertures therein registering with the apertures in said plate, a three-way connector secured in an opening in said intake manifold, a pipe coil in said casing, an air tube connected to one end of said pipe coil and to said three-way connector, an air control valve connected with the other end of said pipe coil, a steam tube connected with said three-way connector and with said casing, a water valve supported on said casing adapted to control the dripping of water onto said apertured boss, and a water supply tube connecting said water valve and the water outlet pipe of the engine.

3. The combination with an engine and the exhaust and intake manifolds thereof, of an apertured casing seated on said exhaust manifold, means to supply water to the casing, said water adapted to flow into said apertures to be converted into steam by the heat from said exhaust manifold, an outlet tube for steam, a three-way connector secured to said engine intake manifold and to said steam outlet tube, an air pipe coil in said casing and having one end connected to said three-way connector, a valve connected with said air pipe coil to control the flow of air therethrough, a water supply pipe connecting said casing with the engine water outlet pipe, and a valve in said water supply pipe.

4. The combination with the intake and exhaust manifolds of an engine, of a casing clamped on the exhaust manifold and having apertures in the wall of the casing contacting said exhaust manifold, means connected with the casing to supply water thereto to permit steam to be formed by the contact of said water with the surface of said exhaust manifold, pipe means in said casing to permit air to be heated by said steam, and means connecting the casing and said pipe means to the engine intake manifold to supply a mixture of hot air and steam to the engine.

5. An engine humidifier comprising a casing adapted to be mounted on the engine exhaust manifold, an apertured concave boss formed in said casing, an air coil in said casing connected with the engine intake manifold, and means connected with the water jacket outlet pipe of the engine for supplying water to said boss.

6. An engine humidifier comprising a casing adapted to be mounted on the engine exhaust manifold, an apertured concave boss formed in said casing, an insulating plate between said casing and the exhaust manifold having apertures therein registering with the apertures in said boss, an air pipe coil in said casing connected with the engine intake manifold, a valve connected therewith, a water supply tube connected with the casing and with the water jacket outlet pipe of the engine, and a valve connected in said tube to control the supply of water to said casing.

In testimony whereof I have hereunto subscribed my name in the presence of two subscribing witnesses.

JAMES O. PATTY.

Witnesses:
CARLTON HILL,
WM. B. PATTY,